Figure 1:
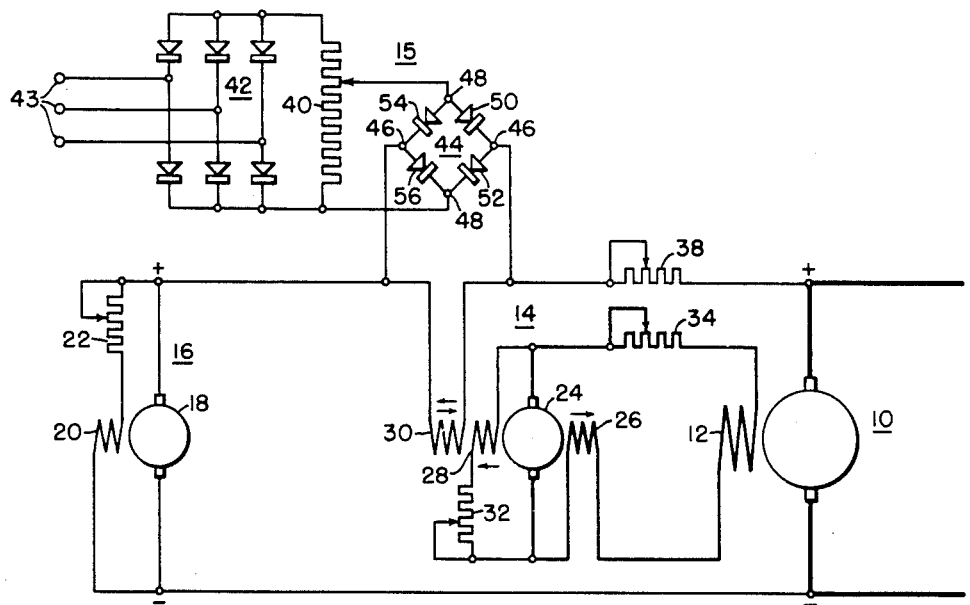

June 26, 1956   D. E. ABELL   2,752,554
CONTROL APPARATUS FOR DYNAMO-ELECTRIC MACHINES
Filed Nov. 25, 1953

WITNESSES
Robert C Baird
K. H. Thomas

INVENTOR
Donald E. Abell
BY
Ezra Savage
ATTORNEY

United States Patent Office 2,752,554
Patented June 26, 1956

2,752,554

CONTROL APPARATUS FOR DYNAMO-ELECTRIC MACHINES

Donald E. Abell, Buffalo, N. Y., assignor to Westinghouse Electric Corporation, East Pittsburgh, Pa., a corporation of Pennsylvania Application November 25, 1953, Serial No. 394,238

6 Claims. (Cl. 322—28)

This invention relates to electrical control apparatus for controlling the output of a generator, and, more particularly, to control apparatus for controlling the rate of change in the magnitude of the output voltage of the generator.

In many applications, especially where more than one generator operates from a common reference source, a given generator and its regulator are switched on and off of a given reference source. Switching transients are produced by such switching operations, and these switching transients effect high rates of increase in the output voltage of the generator, particularly if high gain regulators are being utilized. Further, such large rates of increase in the magnitude of the output voltage of the generator cause high accelerating armature currents in the load connected to the output of the generator. If the load is a motor these large rates of increase in the magnitude of the output voltage of the generator cause the motor to flash over.

Heretofore, in order to reduce this large rate of increase in the output voltage of the generator, it has been necessary to either reduce the gain of the regulator, or to use complicated current limit systems to limit the rate of change of the output voltage of the generator. However, these prior art systems have not always been satisfactory.

An object of this invention is to provide for limiting the rate of change in the magnitude of the output voltage of a generator even though the generator and its associated control amplifier are suddenly connected to means for producing a reference voltage, by preventing the ampere-turns of the control winding of the control amplifier from exceeding a predetermined value at any time during the building up of the generator voltage.

Another object of this invention is to provide for preventing too rapid an increase in the magnitude of the output voltage of a generator when the generator and its associated high gain control exciter are suddenly connected to a source of reference voltage, without impairing the desirable characteristics of the high gain control exciter, by so interconnecting biasing means with the control winding of the control exciter, that once the magnitude of the current flow through the control winding reaches a predetermined value the biasing means by-passes the control current around the control winding to thereby limit the number of ampere-turns of the control winding during the building up of the output voltage of the generator.

Figure 2:
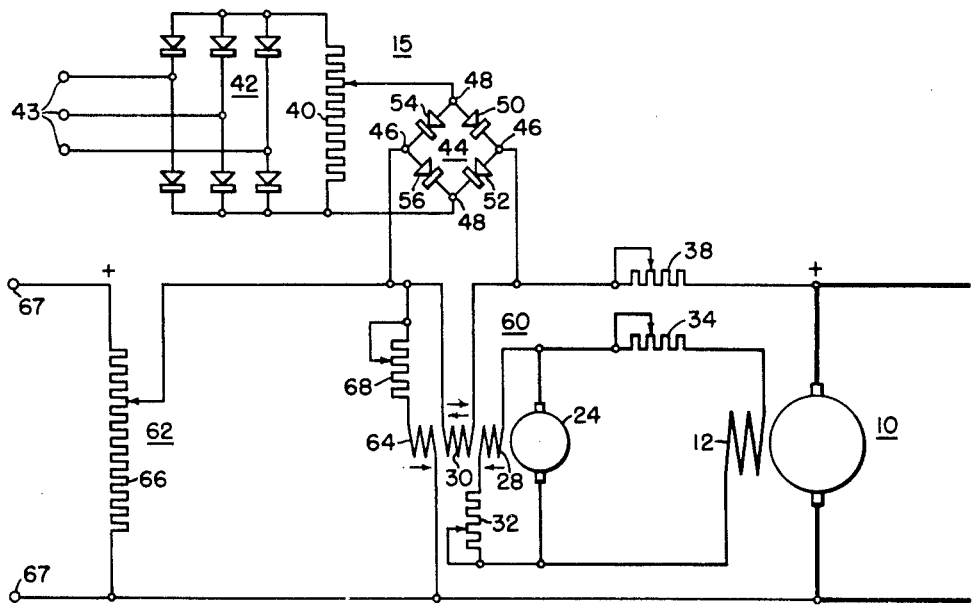

Other objects of this invention will become apparent from the following description when taken in conjunction with the accompanying drawing, in which:

Figure 1 is a schematic diagram of apparatus and circuits embodying the teachings of this invention and in which the control exciter is provided with a self-energizing field, and Fig. 2 is a schematic diagram of apparatus and circuits embodying the teachings of this invention and in which the control exciter is provided with a pattern field instead of a self-energizing field.

Referring to Fig. 1 there is illustrated control apparatus for maintaining the output voltage of a dynamo-electric machine, specifically a direct-current generator 10 having a field winding 12, substantially constant, and for limiting the rate of change in the magnitude of the output voltage of the generator 10 as it is brought up to the regulated value. In general, the control apparatus illustrated in Fig. 1 comprises an amplifier or control exciter 14, connected to control the operation of the generator 10, control means 16, and a biasing means 15 for limiting the rate of change in the magnitude of the output voltage of the generator 10 as its output voltage is brought up to the regulated value as a result of suddenly connecting the generator 10 and control exciter 14 to the control means 16 having a direct-current output reference voltage which in operation is substantially equal to the magnitude of the direct-current output voltage of the generator 10. As can be seen from Fig. 1, the control means 16 is shown in the connected position with respect to the control exciter 14 and the generator 10.

In the embodiment of Fig. 1, the control means or source of reference voltage 16 is a direct-current exciter having an armature 18, a field widing 20, and a variable resistor 22 for adjusting the magnitude of the current flow through the field winding 20 and thus the magnitude of the direct-current output voltage of the direct-current exciter 16. However, it is to be understood that any suitable control means having a substantially constant direct-current output voltage could be substituted for the direct-current exciter illustrated.

In this instance, the control exciter 14 comprises an armature 24, a series self-energizing field 26, an anti-hunt field 28, and a control winding or field 30. The anti-hunt field 28, which is connected in the control exciter self-energizing circuit differentially with respect to the series self-energizing field 26, responds to changes in the armature voltage of the control exciter 14 much faster than the load (not shown). Thus, the anti-hunt field 28 is able to prevent to a great extent oscillations in the control apparatus illustrated in Fig. 1.

As is customary, the control exciter 14 is operated on the straight portion of its saturation curve, and the net effective resistance line of the self-energizing field 26, in combination with the anti-hunt field 28, is adjusted to coincide with the control exciter air-gap line. The self-energizing field 26 furnishes all of the ampere-turns required to generate the output voltage of the generator 10. However, the control field 30 controls the magnitude of the output voltage of the control exciter 14, and thus the magnitude of the output voltage of the generator 10, the algebraic sum of the ampere-turns of the self-energizing field 26, the anti-hunt field 28, and the control field 30 determining the actual value of the output voltage of the generator 10.

In order to tune the control exciter 14, and thus adjust the net effective resistance line of the self-energizing field 26 in combination with the anti-hunt field 28, so as to coincide with the air gap line of the control exciter 14, variable resistors 32 and 34 are provided. In particular, the variable resistor 34 is connected in series circuit relationship with the field winding 12 of the generator 10 and with the self-energizing field 26 so that the magnitude of the current flow through the self-energizing field 26 can be readily varied. On the other hand, the variable resistor 32 is connected in series circuit relationship with the anti-hunt field 28 so that the magnitude of the current flow through the anti-hunt field 28 can be adjusted to the desired value.

As illustrated, the control winding 30 of the control exciter 14 is connected to be responsive to the magnitude of the output voltage of the generator 10, in particular to the magnitude of the deviation of the output voltage of the generator 10 from its regulated value, and is disposed to control the magnitude of the output voltage of the generator 10. In this instance, the control field 30 of the control exciter 14 is connected in series circuit relationship with a variable resistor 38, one end of the series circuit being connected to one side of the output of the generator 10, and the other end of the series circuit being connected to one side of the output of the control means 16, in particular to one side of the armature 18. In order to complete the electrical circuit, the other side of the armature 18 is electrically connected to the other side of the output of the generator 10. The variable resistor 38 is provided in order to obtain the desired magnitude of the current flow through the control field 30 of the control exciter 14 for a given unbalance between the magnitude of the output voltage of the generator 10 and the magnitude of the reference voltage as produced by the control means 16.

The operation of the control apparatus illustrated in Fig. 1 in maintaining the magnitude of the output voltage of the generator 10 substantially constant will now be described. In operation, if the magnitude of the output voltage of the generator 10 increases to a value above its regulated value, current flows from the positive side of the output of the generator 10 through the variable resistor 38 and the control field 30 of the control exciter 14 to the positive side of the direct-current exciter 16 to thereby decrease the magnitude of the output voltage of the control exciter 14, and thus return the output voltage of the generator 10 to its regulated value. On the other hand, if the magnitude of the output voltage of the generator 10 decreases to a value below its regulated value, current flows from the positive side of the armature 18 of the direct-current exciter 16 through the control field 30 of the control exciter 14 and the variable resistor 38 to the positive side of the generator 10. Such an action increases the magnitude of the output voltage of the control exciter 14 to thereby return the output voltage of the generator 10 to its regulated value.

In accordance with the teachings of this invention, the biasing means 15 is so interconnected with the control field 30 of the control exciter 14 and with the control means 16 that when the ampere-turns of the control field 30, during the building up of the output voltage of the generator 10 reaches a predetermined value, the current from the control means 16 by-passes the control field 30 to thereby limit the rate of change in the magnitude of the output voltage of the generator 10 as it is being brought up to normal voltage after the control exciter 14 and the generator 10 have been suddenly connected to the control means 16.

As illustrated, the biasing means 15 comprises an impedance member, in particular a variable resistor 40, a three-phase full-wave dry-type rectifier 42, responsive to a substantially constant alternating-current voltage applied to terminals 43, for producing across the variable resistor 40 a substantially constant direct-current voltage, and a blocking rectifier 44 having input and output terminals 46 and 48, respectively. In this instance, the blocking rectifier 44 comprises rectifier components 50, 52, 54 and 56.

In order to insure a proper limiting action, the control field 30 of the control exciter 14 is connected across the input terminals of the blocking rectifier 44, and a predetermined portion of the variable resistor 40 is connected across the output terminals of the blocking rectifier 44. In operation, once the control exciter 14 and the generator 10 have been suddenly connected to the control means or source of reference voltage 16, the output voltage of the generator 10 begins to build up. During this building up of the output voltage of the generator 10, the magnitude of the reference voltage as produced by the control means 16 is of greater magnitude than the output voltage of the generator 10. Thus, current flows from the positive side of the armature 18 through the control field 30 of the control exciter 14, and the variable resistor 38, to the positive side of the output of the generator 10. This current flow through the control field 30 of the control exciter 14 is in such a direction that on building up the output voltage of the generator 10, the control field 30 acts cumulatively with the self-energizing field 26 of the control exciter 14. However, once the magnitude of this current flow through the control field 30 reaches a predetermined value, as determined by the setting of the variable resistor 40, the excess current by-passes the control field 30 by passing through the rectifier component 56 of the blocking rectifier 44, a portion of the variable resistor 40, and the rectifier component 50 of the blocking rectifier 44, whence it passes through the variable resistor 38 to the positive side of the output of the generator 10. Thus, at no time during the building up of the output voltage of the generator 10 does the biasing means 15 permit the magnitude of the current flow through the control field 30 of the control exciter 14 to exceed a given value as determined by the setting of the variable resistor 40 of the biasing means 15. Therefore, by merely adjusting the setting of the variable resistor 40, the rate at which the output voltage of the generator 10 increases can be readily controlled. It is to be noted that the blocking rectifier 44 is so interconnected with the variable resistor 40 of the biasing means 15 that current cannot flow from the positive end of the variable resistor 40 to any of the other control apparatus illustrated.

Referring to Fig. 2, there is illustrated another type of regulating circuit to which this invention can be applied and in which like components of Figs. 1 and 2 have been given the same reference characters. The main distinction between the apparatus illustrated in Figs. 1 and 2 is that in the apparatus illustrated in Fig. 2, a different type of control exciter 60 has been substituted for the control exciter 14, illustrated in Fig. 1, and a different type of control means 62 has been substituted for the control means 16, illustrated in Fig. 1. In particular, a pattern field 64 has been substituted for the self-energizing field 26 illustrated in Fig. 1, and a variable resistor or potentiometer 66, connected to terminals 67 across which is applied a substantially constant direct-current voltage, has been substituted for the direct-current exciter 16 illustrated in Fig. 1.

In the embodiment illustrated in Fig. 2, the effect of the anti-hunt field 28 of the control exciter 60 is varied by means of the variable resistor 32, and the magnitude of the current flow through the field winding 12 of the generator 10 is varied by means of the variable resistor 34. In order to vary the effect produced by the pattern field 62 of the control exciter 60, a variable resistor 68 is connected in series circuit relationship with the pattern field 64, the series circuit being connected to be responsive to the magnitude of the direct-current voltage across a predetermined portion of the potentiometer 66.

When the generator 10 and the control exciter 60 are suddenly connected to the control means 62, current flows from the positive side of the potentiometer 66 through the control field 30 of the control exciter 60, and the variable resistor 38, to the positive side of the output of the generator 10. This current flow through the control field 30 is in such a direction that the control field 30 acts cumulatively with respect to the pattern field 64. However, once the output voltage of the generator 10 reaches its regulated value, at which time the output reference voltage of the control means 62 is substantially equal to the magnitude of the output voltage of the generator 10, then substantially no current flows through the control field 30 of the control exciter 60. Then once the output voltage of the generator 10 has been built up current flows in either direction through the control field 30 depending upon whether the output voltage of the generator 10 is above or below the regulated value, to thereby maintain, as was explained for the apparatus of Fig. 1, the magnitude of the output voltage of the generator 10 substantially constant. Since the remainder of the operation of the apparatus illustrated in Fig. 2 is substantially the same as the operation of the apparatus illustrated in Fig. 1, a further description of such operation is deemed unnecessary.

The apparatus embodying the teachings of this invention has several advantages. For instance, the rate of change in the output voltage of the generator 10 is effectively controlled after the generator and its associated control exciter have been connected to a suitable source of reference voltage. In addition, this controlling operation is accomplished without destroying the desirable characteristics of a high gain regulator, such as the control exciter 14 or the control exciter 60. Further, the rate of change of the output voltage of the generator 10 can be changed by means of the variable resistor 40 of the biasing means 15 without materially effecting the dynamic gain of either the control exciter 14 or the control exciter 60.

Since certain changes may be made in the above apparatus and different embodiments of the invention could be made without departing from the scope thereof, it is intended that all matter contained in the above description or shown in the accompanying drawing shall be interpreted as illustrative and not in a limiting sense.

I claim as my invention:

1. In control apparatus for controlling the magnitude of the output of a dynamoelectric machine, the combination comprising, an amplifier connected to control the operation of the dynamoelectric machine, said amplifier including a control winding connected to be responsive to the output of the dynamoelectric machine and disposed to control the magnitude of the output of the dynamoelectric machine, control means interconnected with the control winding, said control means having an output voltage that effects a current flow through the control winding and thus a build-up of the output of the dynamoelectric machine, and biasing means so interconnected with the control winding and with said control means that when the ampere-turns of the control winding, during the building up of the output of the dynamoelectric machine, reaches a predetermined value, the current from the said control means by-passes the control winding, to thereby limit the rate of change in the magnitude of the output of the dynamoelectric machine as the dynamoelectric machine is being brought up to the desired output.

2. In control apparatus for controlling the magnitude of the output voltage of a generator, the combination comprising, an amplifier connected to control the operation of the generator, said amplifier including a control winding connected to be responsive to the output of the generator and disposed to control the magnitude of the output voltage of the generator, control means interconnected with the control winding, said control means having an output voltage that effects a current flow through the control winding and thus a build-up of the output voltage of the generator, and biasing means including an impedance member, means for applying to said impedance member a substantially constant voltage, a blocking rectifier having input and output terminals, the control winding being connected across the input terminals of the blocking rectifier, and a predetermined portion of said impedance member being connected across the output terminals of the blocking rectifier, so that when the ampere-turns of the control winding, during the building up of the output voltage of the generator, reaches a predetermined value the current from said control means flows through the blocking rectifier and said impedance member to by-pass the control winding and thus limit the rate of change in the magnitude of the output voltage of the generator as the generator is being brought up to normal voltage.

3. In control apparatus for controlling the magnitude of the output voltage of a generator, the combination comprising, an amplifier connected to control the operation of the generator, said amplifier including a control winding connected to be responsive to the output of the generator and disposed to control the magnitude of the output voltage of the generator, control means interconnected with the control winding, said control means having an output voltage which effects a direct current flow through the control winding and thus a build-up of the output voltage of the generator, and biasing means including a variable resistor, means for applying to said variable resistor a substantially constant direct-current voltage, a blocking rectifier having input and output terminals, the control winding being connected across the input terminals of the blocking rectifier, and a predetermined portion of said variable resistor being connected across the output terminals of the blocking rectifier, so that when the ampere-turns of the control winding, during the building up of the output voltage of the generator, reaches a predetermined value current from said control means flows through the blocking rectifier and said variable resistor to by-pass the control winding and thus limit the rate of change in the magnitude of the output voltage of the generator as the generator is being brought up to normal voltage.

4. In control apparatus for controlling the magnitude of the output voltage of a generator, the combination comprising, a control exciter connected to control the operation of the generator, said control exciter including a control field connected to be responsive to the output of the generator and disposed to control the magnitude of the output voltage of the generator, control means interconnected with the control field and with the output of the generator, said control means having an output reference voltage that effects a current flow through the control field and thus a build-up of the output voltage of the generator, and biasing means so interconnected with the control field and with said control means that when the ampere-turns of the control field, during the building up of the output voltage of the generator, reaches a predetermined value the current from the said control means by-passes the control field, to thereby limit the rate of change in the magnitude of the output voltage of the generator as the generator is being brought up to normal voltage.

5. In control apparatus for controlling the magnitude of the output voltage of a generator, the combination comprising, a control exciter connected to control the operation of the generator, said control exciter including a control field connected to be responsive to the output of the generator and disposed to control the magnitude of the output voltage of the generator, control means interconnected with the control field and with the output of the generator, said control means having an output reference voltage that effects a current flow through the control field and thus a build-up of the output voltage of the generator, and biasing means including an impedance member, means for applying to said impedance member a substantially constant voltage, a blocking rectifier having input and output terminals, the control field being connected across the input terminals of the blocking rectifier, and a predetermined portion of said impedance member being connected across the output terminals of the blocking rectifier, so that when the ampere-turns of the control field, during the building up of the output voltage of the generator, reaches a predetermined value the current from said control means flows through the blocking rectifier and said impedance member to by-pass the control field and thus limit the rate of change in the magnitude of the output voltage of the generator as the generator is being brought up to normal voltage.

6. In control apparatus for controlling the magnitude of the output voltage of a generator, the combination comprising, a control exciter connected to control the operation of the generator, said control exciter including a control field connected to be responsive to the output of the generator and disposed to control the magnitude of the output voltage of the generator, control means interconnected with the control field and with the output of the generator, said control means having an output reference voltage which effects a direct current flow through the control field and thus a build-up of the output voltage of the generator, and biasing means including a variable resistor, means for applying to said variable resistor a substantially constant direct-current voltage, a blocking rectifier having input and output terminals, the control field being connected across the input terminals of the blocking rectifier, and a predetermined portion of said variable resistor being connected across the output terminals of the blocking rectifier, so that when the ampere-turns of the control field, during the building up of the output voltage of the generator, reaches a predetermined value current from said control means flows through the blocking rectifier and said variable resistor to by-pass the control field and thus limit the rate of change in the magnitude of the output voltage of the generator as the generator is being brought up to normal voltage.

References Cited in the file of this patent

UNITED STATES PATENTS 2,679,625     McDonald _____ May 25, 1954